US011180013B1

(12) United States Patent
Yu et al.

(10) Patent No.: US 11,180,013 B1
(45) Date of Patent: Nov. 23, 2021

(54) DUAL-ELECTRIC-MOTOR DRIVING SYSTEM

(71) Applicant: Jing-Jin Electric Technologies Co., Ltd., Beijing (CN)

(72) Inventors: Ping Yu, Beijing (CN); Jianwen Li, Beijing (CN); Xudong Yang, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 16/948,586

(22) Filed: Sep. 24, 2020

(30) Foreign Application Priority Data

Jul. 7, 2020 (CN) .......................... 202010647813.5

(51) Int. Cl.
*B60K 1/02* (2006.01)
*B60K 17/06* (2006.01)
*B60K 17/16* (2006.01)
*F16H 37/04* (2006.01)
*F16H 48/34* (2012.01)
*B60K 17/22* (2006.01)
*B60K 17/356* (2006.01)
*B60K 1/00* (2006.01)
*B60K 7/00* (2006.01)

(52) U.S. Cl.
CPC ................ *B60K 1/02* (2013.01); *B60K 17/06* (2013.01); *B60K 17/16* (2013.01); *B60K 17/22* (2013.01); *F16H 37/042* (2013.01); *F16H 48/34* (2013.01); *B60K 17/356* (2013.01); *B60K 2001/001* (2013.01); *B60K 2007/0061* (2013.01); *F16H 2702/02* (2013.01)

(58) Field of Classification Search
CPC .......... B60K 1/02; B60K 17/06; B60K 17/22; B60K 17/16; B60K 2001/001; B60K 2007/0061; B60K 17/356; F16H 37/042; F16H 48/34; F16H 2702/02
See application file for complete search history.

(56) References Cited

U.S. PATENT DOCUMENTS

2015/0321656 A1* 11/2015 Nishikawa ............ B60W 10/02
                                                                  192/219.4
2017/0313182 A1    11/2017 Isono et al.

FOREIGN PATENT DOCUMENTS

CN        103069186 A  *  4/2013  .......... B60K 7/0007
CN        107250604 A  * 10/2017  .............. B60L 15/20
DE     102011056047 A1     6/2013
(Continued)

*Primary Examiner* — Justin Holmes
(74) *Attorney, Agent, or Firm* — LKGlobal | Lorenz & Kopf, LLP

(57) ABSTRACT

The present disclosure discloses a dual-electric-motor driving system, wherein the dual-electric-motor driving system includes a first electric motor, a second electric motor, two sets of gear reduction mechanisms, a differential-lock mechanism and a parking mechanism; the first electric motor and the second electric motor are arranged coaxially, first-stage pinions of the two sets of gear reduction mechanisms are provided respectively on an output shaft of the first electric motor and an output shaft of the second electric motor, and the differential-lock mechanism is provided at tips of the output shaft of the first electric motor and the output shaft of the second electric motor; the differential-lock mechanism includes a movable fluted disc, a fixed fluted disc and a fixed armature.

20 Claims, 1 Drawing Sheet

(56) References Cited

FOREIGN PATENT DOCUMENTS

DE 102017107322 A1 * 11/2017 ............. F16H 48/36
KR 20190142817 A 12/2019

* cited by examiner

DUAL-ELECTRIC-MOTOR DRIVING SYSTEM

CROSS-REFERENCE TO RELATED APPLICATIONS

The present application claims priority to Chinese application No. No. 202010647813.5 titled "Dual-Electric-Motor Driving System", filed on Jul. 7, 2020, which is hereby incorporated herein by reference in its entirety.

TECHNICAL FIELD

This Application pertains to the technical field of new-energy vehicles, and particularly relates to a dual-electric-motor driving system.

BACKGROUND

Currently, the driving systems of purely electric vehicles include mainly the single-electric-motor concentrated driving mode and the multi-electric-motor distributed driving mode. Currently, most of the purely electric vehicles in the market employ the concentrated driving mode, wherein the driving force of the electric motor is coupled to the differential via gears, shafts and so on, and is approximately equally distributed to the left half shaft and the right half shaft, which cannot independently control one single wheel. As compared with the electric vehicles of the single-electric-motor concentrated driving mode, the independent wheel driving using the dual-electric-motor distributed driving mode has the advantages of a compact structure, a convenient layout and a good flexibility of the vehicle driving.

The design of dual-electric-motor independent driving systems is required to take into consideration factors such as the spatial arrangement and the force bearing of the shaftings of the speed reducers. As the core component part of electric vehicles, the systems do not only have high requirements on their performance, but also have stricter requirements on their safety and power performance. Especially, when the systems are utilized in off-road vehicles, to improve their trap escaping capacity and parking safety is a problem that is required to be solved urgently. In addition, other objects, desirable features and characteristics will become apparent from the subsequent summary and detailed description, and the appended claims, taken in conjunction with the accompanying drawings and this background.

SUMMARY

Aiming at the above problems, the present disclosure discloses a dual-electric-motor driving system, to overcome the above problems or at least partially solve the above problems.

In order to achieve the above objects, the present disclosure employs the following technical solutions:

The embodiments of the present disclosure disclose a dual-electric-motor driving system, wherein the dual-electric-motor driving system comprises a first electric motor, a second electric motor, two sets of gear reduction mechanisms, a differential-lock mechanism and a parking mechanism;

the first electric motor and the second electric motor are arranged coaxially, first-stage pinions of the two sets of gear reduction mechanisms are provided respectively on an output shaft of the first electric motor and an output shaft of the second electric motor, and the differential-lock mechanism is provided at tips of the output shaft of the first electric motor and the output shaft of the second electric motor; and the parking mechanism is integrated with the differential-lock mechanism, and is provided on one side of the differential-lock mechanism; and the differential-lock mechanism comprises a movable fluted disc, a fixed fluted disc and a fixed armature, the movable fluted disc is slidably connected to the output shaft of the first electric motor, the fixed fluted disc is fixedly connected to the output shaft of the second electric motor, and when relative rotation between the dual electric motors is required to be locked, the fixed armature is electrified to generate an electromagnetic force, to cause the movable fluted disc to move toward the fixed fluted disc, and contrate teeth on the movable fluted disc and the fixed fluted disc are engaged to realize the locking.

Optionally, a returning spring is provided between the movable fluted disc and the output shaft of the first electric motor, and is configured to, after the fixed armature has been powered off, disconnect the engaged connection between the movable fluted disc and the fixed fluted disc.

Optionally, the two sets of gear reduction mechanisms comprise at least two stages of gear transmission, and the stages of gears are arranged coaxially.

Optionally, each of the two sets of gear reduction mechanisms comprises a first-stage gearwheel, a second-stage pinion and a second-stage gearwheel, the first-stage gearwheel is engaged with the first-stage pinion and is adjacent to one of the electric motors, the second-stage pinion and the first-stage gearwheel are arranged coaxially, the second-stage pinion is further away from the electric motor and is arranged in a middle of a reduction gearbox, and the second-stage pinion is engaged with the second-stage gearwheel, to reduce an axial dimension of the dual-electric-motor driving system.

Optionally, the parking mechanism is capable of performing a parking-in action or parking-out action when the differential-lock mechanism is in a locked state.

Optionally, the parking mechanism comprises a parking gear, a parking detent and a parking actuating mechanism, the parking gear is integrated with the fixed fluted disc, the parking detent is coupled to the parking gear, and the parking actuating mechanism is configured to drive the parking detent to shift between a parking-in position and a parking-out position.

Optionally, electric-motor resolver rotors are provided between the differential-lock mechanism and the first-stage pinions, and electric-motor resolver stators are provided on housings of the speed reducers.

Optionally, rolling bearings are provided on a housing on two sides of a rotor of the first electric motor and a rotor of the second electric motor, and the rolling bearings are adjacent to leading-out terminals of the stator of the first electric motor and the stator of the second electric motor, to reduce an axial distance of the first electric motor and the second electric motor.

Optionally, the fixed fluted disc is provided with a first auxiliary bearing on a side that is adjacent to the output shaft of the second electric motor.

Optionally, the output shaft of the first electric motor is provided with a cylindrical concave at a front end, the output shaft of the second electric motor is provided with a cylindrical convex at a rear end, and a second auxiliary bearing is provided between the concave and the convex.

The advantages and advantageous effects of the present disclosure are as follows.

The above technical solutions of the dual-electric-motor driving system disclosed by the embodiments of the present disclosure can independently regulate the operation states of each of the driving wheels, to provide flexibility of the driving. The technical solutions, by using the differential-lock mechanism, realize the function of a differential lock, which can reasonably couple the driving forces of the dual electric motors in trap escaping or extreme off-road driving, to improve the trap escaping capacity.

Furthermore, the technical solutions, by using the parking mechanism, realize the parking function (P gear), which can improve the safety and the reliability of parking. The technical solutions can reduce the axial dimension of the dual-electric-motor driving system, to reasonably use the space, and to enable the resolvers of the electric motors to be installed inside the housings of the speed reducers, to obtain a more compact structure.

BRIEF DESCRIPTION OF THE DRAWINGS

The present invention will hereinafter be described in conjunction with the following drawing figures, wherein like numerals denote like elements, and.

Figure 1:
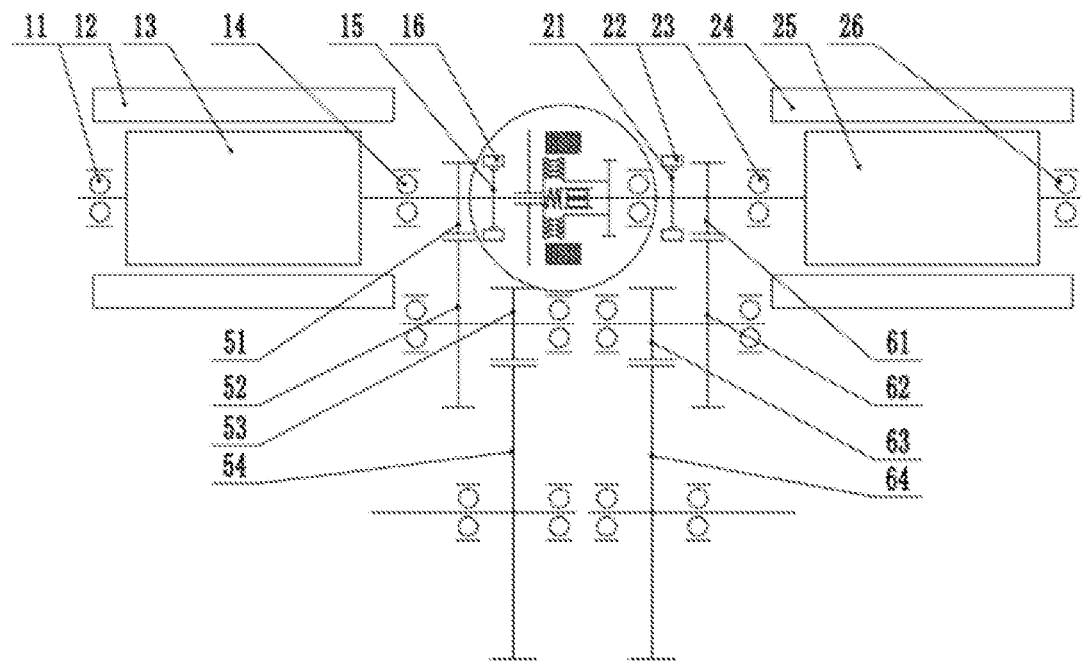
FIG. 1 is a schematic structural diagram of the dual-electric-motor driving system according to an embodiment of the present disclosure.

In the drawings: 11 is the rear bearing of the first electric motor; 12 is the stator of the first electric motor; 13 is the rotor of the first electric motor; 14 is the main bearing of the first electric motor; 15 is the resolver rotor of the first electric motor; 16 is the resolver stator of the first electric motor;

21 is the resolver rotor of the second electric motor; 22 is the resolver stator of the second electric motor; 23 is the main bearing of the second electric motor; 24 is the stator of the second electric motor; 25 is the rotor of the second electric motor; 26 is the rear bearing of the second electric motor;

31 is the first auxiliary bearing; 32 is the second auxiliary bearing;

41 is the movable fluted disc; 42 is the returning spring; 43 is the fixed armature; 44 is the fixed fluted disc;

51 is the first-stage pinion; 52 is the first-stage gearwheel; 53 is the second-stage pinion; 54 is the second-stage gearwheel;

61 is the first-stage pinion; 62 is the first-stage gearwheel; 63 is the second-stage pinion; and 64 is the second-stage gearwheel.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the present disclosure clearer, the technical solutions of the present disclosure will be clearly and complete described below with reference to the particular embodiments and the corresponding drawings of the present disclosure. Apparently, the described embodiments are merely certain embodiments of the present disclosure, rather than all of the embodiments. All of the other embodiments that a person skilled in the art obtains on the basis of the embodiments in the present disclosure without paying creative work fall within the protection scope of the present disclosure.

It should be understood that the terms "comprise/include", "consist of" and any other variants are intended to encompass non-exclusive inclusions, so that a product, device, process or method that comprises a series of elements does not only comprise those elements, but may further, if required, comprise other elements not explicitly listed, or further comprise elements inherent to such a product, device, process or method. Unless further limited, elements defined by the wordings "comprise/include" and "consist of" do not exclude additional identical elements in the product, device, process or method that comprises the elements.

In order to facilitate the understanding, in the present disclosure, the direction on the right in FIG. 1 of the drawings is defined as the rear end and the direction on the left is defined as the front end. However, the directions or position relations that are indicated by the terms "upper", "lower", "front", "rear", "left", "right", "top", "bottom", "inner", "outer" and so on are based on the directions or position relations shown in the drawings, and are merely for facilitating and simplifying the description of the present disclosure, and they do not indicate or suggest that the related device, component or structure must have the particular direction or be constructed or operated in the particular direction, and should not be understood as limiting the present disclosure.

In the present disclosure, unless expressly provided and defined otherwise, the terms "mount", "couple", "connect", "fix" and so on should be understood in a broad sense. For example, they may be fixed connection, or detachable connection, or integral connection; they may be mechanical connection, or electric connection; and they may be direct connection, or indirect connection via an intermediate element, or internal communication between two elements or interaction between two elements. A person skilled in the art can understand the particular meanings of the above terms in the present disclosure according to specific circumstances.

The technical solutions provided by the embodiments of the present disclosure will be described in detail below with reference to the drawings.

Referring to the schematic structural diagram of the dual-electric-motor driving system shown in FIG. 1, the embodiments of the present disclosure disclose a dual-electric-motor driving system, wherein the dual-electric-motor driving system comprises a first electric motor, a second electric motor, two sets of gear reduction mechanisms, a differential-lock mechanism and a parking mechanism; and the first electric motor and the second electric motor are arranged coaxially, first-stage pinions (51, 61) of the two sets of gear reduction mechanisms are provided respectively on an output shaft of the first electric motor and an output shaft of the second electric motor, and the differential-lock mechanism is provided at the tips of the output shaft of the first electric motor and the output shaft of the second electric motor. It can be known from FIG. 1 that the tips are at positions in the middle, thereby facilitating the installation and fixing of the differential-lock mechanism.

The parking mechanism is integrated with the differential-lock mechanism; for example, parts of the parking mechanism are integrated with parts of the differential-lock mechanism. Furthermore, the parking mechanism is provided on one side of the differential-lock mechanism, and, according to the demands, can be configured to be linked with the differential-lock mechanism.

Figure 2:
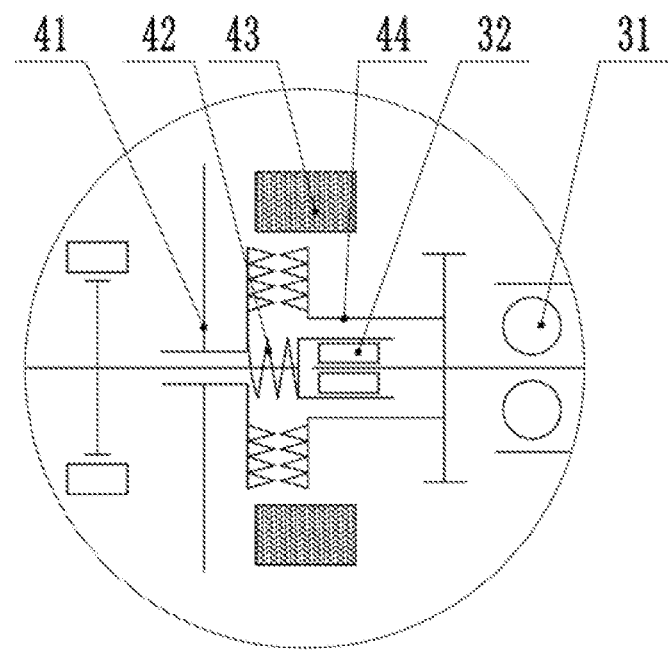
FIG. 2 is a schematic structural diagram of the differential-lock mechanism in FIG. 1.

Referring to the schematic structural diagram of the differential-lock mechanism shown in FIG. 2, the differential-lock mechanism comprises a movable fluted disc 41, a fixed fluted disc 44 and a fixed armature 43, the movable fluted disc 41 is slidably connected to the output shaft of the first electric motor, the fixed fluted disc 44 is fixedly connected to the output shaft of the second electric motor, and the fixed armature 43 is fixed to the housing of a speed reducer. When the relative rotation between the dual electric motors is required to be locked, the fixed armature 43 is electrified to generate an electromagnetic force, to cause the movable fluted disc 41 to move toward the fixed fluted disc 44, to enable them to be attraction-joined together, and meanwhile the contrate teeth on the movable fluted disc and the fixed fluted disc are engaged, thereby locking the two output shafts of the dual electric motors together, to serve as one power source to provide power to the wheels.

The embodiments of the present disclosure, by the coaxial arrangement of the dual electric motors and the reasonable layout of the gear reduction mechanisms, can reduce the axial dimension of the gearbox, and, by using the differential-lock mechanism, realizes the coupling between the output powers of the dual electric motors, increases the maximum output power, and improves the trap escaping capacity of the vehicle.

In an embodiment, referring to FIG. 2, a returning spring 42 is provided between the movable-fluted-disc 41 and the output shaft of the first electric motor. When the fixed armature 43 is being electrified the returning spring 42 is compressed, and when it is powered off the returning spring causes the movable fluted disc 41 to return, thereby disconnecting the engaged connection between the movable fluted disc 41 and the fixed fluted disc 44.

The function of the returning spring 42 is to maintain the reliability of the disengagement of the differential-lock mechanism when locking is not required. The magnitude of the force that is required to be provided by the returning spring 42 is decided by the factors such as the weight of the movable-fluted-disc, the resistance to shock and the return response time.

In an embodiment, referring continuously to FIG. 1, the two sets of gear reduction mechanisms respectively provided comprise at least two stages of gear transmission, and each of the stages of gears may be arranged coaxially.

Particularly, each of the two sets of gear reduction mechanisms comprises a first-stage gearwheel (52, 62), a second-stage pinion (53, 63) and a second-stage gearwheel (54, 64). It can be known from FIG. 1 that the first-stage gearwheel is engaged with the first-stage pinion and is adjacent to one of the electric motors, the second-stage pinion and the first-stage gearwheel are arranged coaxially, the second-stage pinion is further away from the electric motor and is arranged in the middle of a reduction gearbox, and the second-stage pinion is engaged with the second-stage gearwheel, to reduce the axial dimension of the dual-electric-motor driving system. Furthermore, because the second-stage gears are provided on the side further away from the electric motors, the two first-stage pinions on the left and on the right have a larger axial space therebetween, which space may be used to lay out the differential-lock mechanism, the resolver and the parking mechanism described below.

In an embodiment, the parking mechanism is capable of performing a parking-in action or parking-out action when the differential-lock mechanism is in a locked state.

Particularly, the parking mechanism comprises a parking gear, a parking detent and a parking actuating mechanism (not shown in the drawings). The parking gear is integrated with the fixed fluted disc; preferably, the parking gear is provided on the outer circumference of the fixed fluted disc. Then, the parking detent is coupled to the parking gear, and the parking actuating mechanism is configured to drive the parking detent to shift between a parking-in position and a parking-out position. The above-described parking detent and parking actuating mechanism may be any one of structures that can realize parking, and are not particularly limited here.

In an embodiment, electric-motor resolver rotors (15, 21) are provided between the differential-lock mechanism and the first-stage pinions, and electric-motor resolver stators (16, 22) are provided on housings of the speed reducers.

Particularly, the first-stage pinion 51 and the first-stage pinion 61 are respectively provided adjacent to the main bearings of the electric motors, and the resolvers of the first electric motor and the second electric motor are immediately next to the first-stage pinion 51 and the first-stage pinion 61 respectively, and can be further away from the stators of the electric motors, to reduce the influence of the stators of the electric motors on the resolvers.

In an embodiment, rolling bearings are provided on the housing on two sides of the rotor 13 of the first electric motor and the rotor 25 of the second electric motor. The rolling bearings particularly include a main bearing 14 of the first electric motor, a rear bearing 11 of the first electric motor, a main bearing 23 of the second electric motor and a rear bearing 26 of the second electric motor. The positions of all of the rolling bearings are adjacent to the positions of the leading-out terminals of the stator 12 of the first electric motor and the stator 24 of the second electric motor. Particularly, it can be known by referring to FIG. 1 that the length range of the stator of the first electric motor overlap with the positions of the rolling bearings in the axial direction partly, the purpose of which is to reduce the axial distance occupied by the first electric motor and the second electric motor.

In an embodiment, the fixed fluted disc 44 is provided with a first auxiliary bearing 23 on the side that is adjacent to the output shaft of the second electric motor. Furthermore, the output shaft of the first electric motor is provided with a cylindrical concave at the front end, the output shaft of the second electric motor is provided with a cylindrical convex at the rear end, and a second auxiliary bearing is provided between the concave and the convex. Such a structure guarantees the coaxiality and the stability of the engagement between the contrate teeth.

The output shaft of the first electric motor and the output shaft of the second electric motor are provided with a first auxiliary bearing 23 and a second auxiliary bearing 31 respectively as auxiliary supports, thereby improving the supporting rigidity of the output shafts of the electric motors and the first-stage pinions (51, 61).

The above are merely embodiments of the present disclosure, and are not limiting the protection scope of the present disclosure. Any modifications, equivalent substitutions, improvements and extensions that are made within the spirit and principle of the present disclosure should fall within the protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A dual-electric-motor driving system, characterized in that the dual-electric-motor driving system comprises a first electric motor, a second electric motor, two sets of gear reduction mechanisms, a differential-lock mechanism and a parking mechanism;

the first electric motor and the second electric motor are arranged coaxially, first-stage pinions of the two sets of gear reduction mechanisms are provided respectively on an output shaft of the first electric motor and an output shaft of the second electric motor, and the differential-lock mechanism is provided at tips of the output shaft of the first electric motor and the output shaft of the second electric motor; and the parking mechanism is integrated with the differential-lock mechanism, and is provided on one side of the differential-lock mechanism; and the differential-lock mechanism comprises a movable fluted disc, a fixed fluted disc and a fixed armature, the movable fluted disc is slidably connected to the output shaft of the first electric motor, the fixed fluted disc is fixedly connected to the output shaft of the second electric motor, and when relative rotation between the dual electric motors is required to be locked, the fixed armature is electrified to generate an electromagnetic force, to cause the movable fluted disc to move toward the fixed fluted disc, and contrate teeth on the movable fluted disc and the fixed fluted disc are engaged to realize the locking.

2. The dual-electric-motor driving system according to claim 1, characterized in that a returning spring is provided between the movable fluted disc and the output shaft of the first electric motor, and is configured to, after the fixed armature has been powered off, disconnect the engaged connection between the movable fluted disc and the fixed fluted disc.

3. The dual-electric-motor driving system according to claim 1, characterized in that the two sets of gear reduction mechanisms comprise at least two stages of gear transmission, and the stages of gears are arranged coaxially.

4. The dual-electric-motor driving system according to claim 3, characterized in that each of the two sets of gear reduction mechanisms comprises a first-stage gearwheel, a second-stage pinion and a second-stage gearwheel, the first-stage gearwheel is engaged with the first-stage pinion and is adjacent to one of the electric motors, the second-stage pinion and the first-stage gearwheel are arranged coaxially, the second-stage pinion is further away from the electric motor and is arranged in a middle of a reduction gearbox, and the second-stage pinion is engaged with the second-stage gearwheel, to reduce an axial dimension of the dual-electric-motor driving system.

5. The dual-electric-motor driving system according to claim 1, characterized in that the parking mechanism is capable of performing a parking-in action or parking-out action when the differential-lock mechanism is in a locked state.

6. The dual-electric-motor driving system according to claim 4, characterized in that the parking mechanism comprises a parking gear, a parking detent and a parking actuating mechanism, the parking gear is integrated with the fixed fluted disc, the parking detent is coupled to the parking gear, and the parking actuating mechanism is configured to drive the parking detent to shift between a parking-in position and a parking-out position.

7. The dual-electric-motor driving system according to claim 1, characterized in that electric-motor resolver rotors are provided between the differential-lock mechanism and the first-stage pinions, and electric-motor resolver stators are provided on housings of the speed reducers.

8. The dual-electric-motor driving system according to claim 1, characterized in that rolling bearings are provided on a housing on two sides of a rotor of the first electric motor and a rotor of the second electric motor, and the rolling bearings are adjacent to leading-out terminals of the stator of the first electric motor and the stator of the second electric motor, to reduce an axial distance of the first electric motor and the second electric motor.

9. The dual-electric-motor driving system according to claim 2, characterized in that rolling bearings are provided on a housing on two sides of a rotor of the first electric motor and a rotor of the second electric motor, and the rolling bearings are adjacent to leading-out terminals of the stator of the first electric motor and the stator of the second electric motor, to reduce an axial distance of the first electric motor and the second electric motor.

10. The dual-electric-motor driving system according to claim 3, characterized in that rolling bearings are provided on a housing on two sides of a rotor of the first electric motor and a rotor of the second electric motor, and the rolling bearings are adjacent to leading-out terminals of the stator of the first electric motor and the stator of the second electric motor, to reduce an axial distance of the first electric motor and the second electric motor.

11. The dual-electric-motor driving system according to claim 4, characterized in that rolling bearings are provided on a housing on two sides of a rotor of the first electric motor and a rotor of the second electric motor, and the rolling bearings are adjacent to leading-out terminals of the stator of the first electric motor and the stator of the second electric motor, to reduce an axial distance of the first electric motor and the second electric motor.

12. The dual-electric-motor driving system according to claim 5, characterized in that rolling bearings are provided on a housing on two sides of a rotor of the first electric motor and a rotor of the second electric motor, and the rolling bearings are adjacent to leading-out terminals of the stator of the first electric motor and the stator of the second electric motor, to reduce an axial distance of the first electric motor and the second electric motor.

13. The dual-electric-motor driving system according to claim 6, characterized in that rolling bearings are provided on a housing on two sides of a rotor of the first electric motor and a rotor of the second electric motor, and the rolling bearings are adjacent to leading-out terminals of the stator of the first electric motor and the stator of the second electric motor, to reduce an axial distance of the first electric motor and the second electric motor.

14. The dual-electric-motor driving system according to claim 1, characterized in that the fixed fluted disc is provided with a first auxiliary bearing on a side that is adjacent to the output shaft of the second electric motor.

15. The dual-electric-motor driving system according to claim 1, characterized in that the output shaft of the first electric motor is provided with a cylindrical concave at a front end, the output shaft of the second electric motor is provided with a cylindrical convex at a rear end, and a second auxiliary bearing is provided between the concave and the convex.

16. The dual-electric-motor driving system according to claim 2, characterized in that the output shaft of the first electric motor is provided with a cylindrical concave at a front end, the output shaft of the second electric motor is provided with a cylindrical convex at a rear end, and a second auxiliary bearing is provided between the concave and the convex.

17. The dual-electric-motor driving system according to claim 3, characterized in that the output shaft of the first electric motor is provided with a cylindrical concave at a front end, the output shaft of the second electric motor is provided with a cylindrical convex at a rear end, and a second auxiliary bearing is provided between the concave and the convex.

18. The dual-electric-motor driving system according to claim 4, characterized in that the output shaft of the first electric motor is provided with a cylindrical concave at a front end, the output shaft of the second electric motor is provided with a cylindrical convex at a rear end, and a second auxiliary bearing is provided between the concave and the convex.

19. The dual-electric-motor driving system according to claim 5, characterized in that the output shaft of the first electric motor is provided with a cylindrical concave at a front end, the output shaft of the second electric motor is provided with a cylindrical convex at a rear end, and a second auxiliary bearing is provided between the concave and the convex.

20. The dual-electric-motor driving system according to claim 6, characterized in that the output shaft of the first electric motor is provided with a cylindrical concave at a front end, the output shaft of the second electric motor is provided with a cylindrical convex at a rear end, and a second auxiliary bearing is provided between the concave and the convex.

* * * * *